US011343082B2

(12) United States Patent
Tsirkin et al.

(10) Patent No.: US 11,343,082 B2
(45) Date of Patent: May 24, 2022

(54) RESOURCE SHARING FOR TRUSTED EXECUTION ENVIRONMENTS

(71) Applicant: Red Hat, Inc., Raleigh, NC (US)

(72) Inventors: Michael Tsirkin, Yokneam Illit (IL); Michael Hingston McLaughlin Bursell, Famborough (GB)

(73) Assignee: Red Hat, Inc., Raleigh, NC (US)

(*) Notice: Subject to any disclaimer, the term of this patent is extended or adjusted under 35 U.S.C. 154(b) by 59 days.

(21) Appl. No.: 17/035,008

(22) Filed: Sep. 28, 2020

(65) Prior Publication Data
US 2022/0103349 A1 Mar. 31, 2022

(51) Int. Cl.
*G06F 21/00* (2013.01)
*H04L 9/08* (2006.01)

(52) U.S. Cl.
CPC .................................. *H04L 9/083* (2013.01)

(58) Field of Classification Search
None
See application file for complete search history.

(56) References Cited

U.S. PATENT DOCUMENTS

| 9,674,182 | B2 | 6/2017 | Smith | |
|---|---|---|---|---|
| 10,091,241 | B2* | 10/2018 | Keyser | H04L 63/062 |
| 10,200,367 | B2 | 2/2019 | Chastain et al. | |
| 10,389,709 | B2 | 8/2019 | Potlapally et al. | |
| 10,621,350 | B2 | 4/2020 | Novak et al. | |
| 2015/0244716 | A1* | 8/2015 | Potlapally | H04L 63/12 713/155 |
| 2016/0105430 | A1* | 4/2016 | Smith | H04L 67/10 713/171 |
| 2016/0350534 | A1 | 12/2016 | Poornachandran et al. | |
| 2018/0048643 | A1* | 2/2018 | Sharaga | H04L 63/0869 |
| 2018/0234403 | A1* | 8/2018 | Casella | H04L 63/0807 |
| 2019/0042759 | A1 | 2/2019 | Smith et al. | |

(Continued)

OTHER PUBLICATIONS

Advance Micro Devices, Inc. "Secure Encrypted Virtualization API", Feb. 2018, 99 pages, http://developer.amd.com/wordpress/media/2017/11/55766_SEV-KM-API_Sepecification.pdf.

(Continued)

*Primary Examiner* — Maung T Lwin
(74) *Attorney, Agent, or Firm* — Lowenstein Sandler LLP

(57) ABSTRACT

The technology disclosed herein enables resource sharing for trusted execution environments. An example method can include: establishing a first trusted execution environment (TEE) in a first computing device; establishing, by the first TEE, a set of shell TEEs, where each shell TEE is configured in view of one or more configuration parameters associated with the set of shell TEEs; receiving, by the first TEE, a request from a tenant computing device to establish a second TEE; determining, by the first TEE, whether the configuration parameters associated with the set of shell TEEs satisfy one or more request parameters for the second TEE; and responsive to determining that the configuration parameters associated with the set of shell TEEs satisfy the one or more request parameters for the second TEE, establishing, by the first TEE, the second TEE to satisfy the request, wherein the second TEE is selected from the set of shell TEEs, and causing, by the first TEE, the second TEE to communicate with tenant computing device.

20 Claims, 6 Drawing Sheets

(56) References Cited

U.S. PATENT DOCUMENTS

| | | | |
|---|---|---|---|
| 2019/0095879 A1* | 3/2019 | Eyal | G06Q 20/06 |
| 2019/0102555 A1* | 4/2019 | Novak | G06F 21/57 |
| 2019/0155728 A1 | 5/2019 | Ferguson et al. | |
| 2020/0202038 A1* | 6/2020 | Zhang | G16H 50/30 |

OTHER PUBLICATIONS

Buhren, R. et al., "Insecure Unitl Proven Updated: Analyzing AMD SEV's Remote Attestation", Technical University Berlin Security in Telecommunications, Hasso Plattner Institute Potsdam, Sep. 2, 2019, 13 pages, hppts://arxiv.org/pdf/1908..11680.pdf.

Alder et al., "S-FaaS: Trustworthy and Accountable Function-as-a-Service Using Intel SGX", Oct. 14, 2018, 16 pages https://arxiv.org/pdf/1810.06080.pdf.

Zhao et al., "SecTEE: A Software-based Approach to Secure Enclave Architecture Using TEE", Nov. 11-15, 2019, 18 pages https://dl.acm.org/doi/10.1145/3319535.3363205.

Jang et al., "SeCReT: Secure Channel between Rich Execution Environment and Trusted Execution Environment", Feb. 8-11, 2015, 15 pages https://pdfs.semanticscholar.org/7b14/f0874dc428305fc5be293086f6c20874ec0b.pdf.

* cited by examiner

RESOURCE SHARING FOR TRUSTED EXECUTION ENVIRONMENTS

TECHNICAL FIELD

The present disclosure generally relates to computer systems, and more particularly, to resource sharing for trusted execution environments in computer systems.

BACKGROUND

A trusted execution environment (TEE) is a secure area of a main processor that can guarantee code and data loaded inside to be protected with respect to confidentiality and integrity. A TEE as an isolated execution environment can provide security features such as isolated execution, integrity of applications executing with the TEE, along with confidentiality of stored data. A TEE can provide an execution space with a higher level of security for trusted applications that run on computing devices that are not trusted by the application owner.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
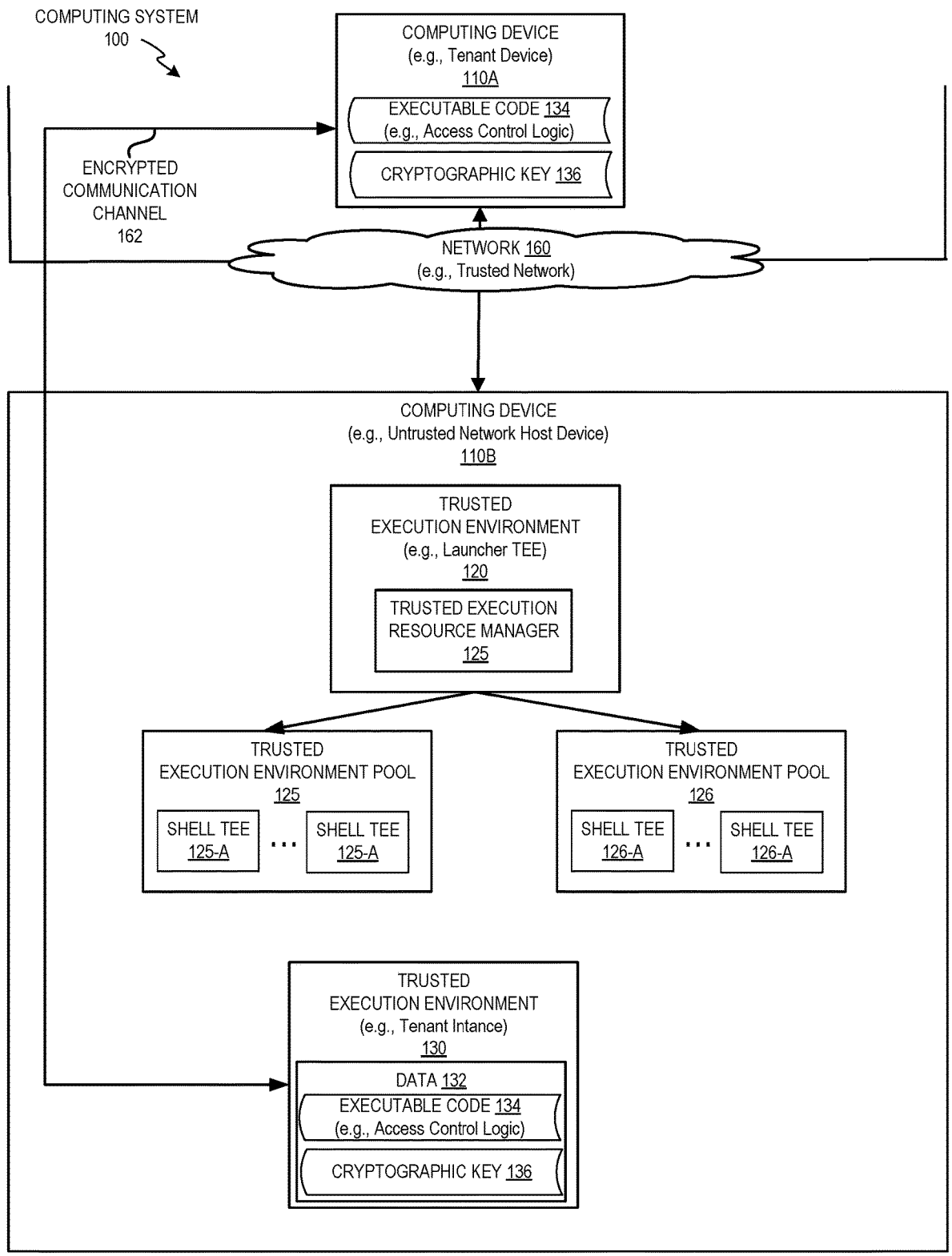
FIG. 1 depicts a high-level block diagram of an example computing environment that facilitates resource sharing for trusted execution environments, in accordance with one or more aspects of the present disclosure.

Described herein are methods and systems for efficient launching for trusted execution environments in computer systems. Trusted Execution Environments (TEEs) can encrypt memory pages and subsequently only decrypt them when they are being processed in the central processing unit (CPU), graphics processing unit (GPU), network interface card (NIC), or other processor component of an untrusted host. TEEs can allow tenants of untrusted computing environments to deploy applications securely in those environments. In such instances, TEEs can provide the ability to enable private computing in cloud computing environments and Internet of Things (IoT) implementations where the computing devices to which applications are to be deployed are untrusted and/or insecure. TEEs, however, present several technological challenges. In some instances, TEE implementations can involve increases in deployment latency, since each TEE launched by a tenant involves validation of the TEE by the tenant. When the tenant is operating from a device outside the untrusted host network, this can present significant performance delays as a result of communication between the trusted network and untrusted network since the validation steps between the tenant and host should be performed for each TEE to be launched.

Additionally, TEEs can often be implemented in conventional shared computing environments (e.g., such as cloud computing environments) that are configured under the premise of "overcommit", where resources are provisioned to be shared efficiently. TEEs in general, and encrypted virtual machines (VMs) in particular, can cause problems with resource overcommit since memory is often encrypted and therefore may not be efficiently shared when the environments are executing. Conventional implementations address this by starting up and shutting down TEEs on demand. This, however, can result in additional increases in latencies and decreases in overall system availability, since application deployments often rely on the ability to start environments as quickly as possible.

Aspects of the present disclosure address the above and other deficiencies by implementing technology to facilitate resource sharing for trusted execution environments. In particular, a trusted execution resource manager can establish a launcher TEE instance in an untrusted host computing device. The launcher TEE instance can establish pools of shell TEE instances, where each shell TEE instance in a particular pool is configured with similar configuration parameters (e.g., each shell TEE in a particular can be configured with the same underlying operating system (OS)). Notably, each shell TEE in a pool can be provisioned with basic run-time capabilities (e.g., with an OS, but without an executable payload) so that the main portion of the TEE can be readily available to service a request from a tenant. Subsequently, the trusted execution resource manager can receive a request from a tenant device to establish a TEE in an untrusted host computing device. The trusted execution resource manager can use parameters received in the request to identify a pool of shell TEEs that are configured sufficiently to satisfy the request parameters, select a shell TEE from the identified pool, and provision the TEE for the requesting tenant computing device. The trusted execution resource manager can subsequently facilitate the establishment of a secure communication channel between the requesting tenant and the newly established TEE that was selected from the TEE pool.

Aspects of the present disclosure present advantages over conventional solutions to the issues noted above. First, utilizing a launcher TEE instance to provision pools of shell TEEs can significantly improve resource management when deploying TEEs. Since the launcher instance can configure and establish basic run-time environments before a request is received, processing resources used in TEE provisioning can be utilized more efficiently before tenant involvement. Additionally, by drawing from a pool of pre-provisioned TEE shell instances, latency encountered during application deployment can be significantly reduced. Since a tenant request can be serviced with a shell TEE that has already been provisioned with a basic run-time environment suitable for the tenant request, the amount of time and processing resources needed to establish a TEE can be significantly reduced. Moreover, by improving the efficiency of provisioning individual TEEs, the efficiency of the overall launch process is significantly improved if the tenant loses communication with the untrusted host. This, in turn, can significantly improve efficiency and decrease resource requirements involved in deployment across a cloud computing environment that includes multiple hosts computing devices.

FIG. 1 depicts an illustrative architecture of elements of a computing environment 100, in accordance with an example of the present disclosure. It should be noted that other architectures for computing environment 100 are possible, and that the implementation of a computing environment utilizing embodiments of the disclosure are not necessarily limited to the specific architecture depicted. In the example shown in FIG. 1, computing environment 100 may include a tenant computing devices 110A and one or more of untrusted network host computing devices 110B that are capable of supporting trusted execution environments.

Computing devices 110A-B may include any computing devices that are capable of storing or accessing data and may include one or more servers, workstations, desktop computers, laptop computers, tablet computers, mobile phones, palm-sized computing devices, personal digital assistants (PDAs), smart watches, robotic devices (e.g., drones, autonomous vehicles), data storage device (e.g., USB drive), other device, or a combination thereof. Computing devices 110A-B may include one or more hardware processors based on x86, PowerPC®, SPARC®, ARM®, other hardware, or a combination thereof.

Computing device 110A may be referred to as a tenant computing device. Computing device 110A may be a device utilized by a tenant and may store executable code 134 and cryptographic key data 136 that can be used by deployed TEEs.

Executable code 134 may be loaded into a trusted execution environment 130 and may control how computing device 110B interacts with protected content. Executable code 134 may include executable data, configuration data, other data, or a combination thereof and may be stored and executed in the trusted execution environment 130. Executable code 134 may be stored in any format and may include one or more file system objects (e.g., files, directories, links), database objects (e.g., records, tables, field value pairs, tuples), other storage objects, or a combination thereof. Executable code 134 may implement logic for controlling the distribution, retrieval, or use of protected content.

Executable code 134 may use one or more cryptographic keys 136 to restrict access to protected content. Cryptographic key 136 may include cryptographic key data with one or more cryptographic bit sequences or other cryptographic keying material for storing, generating, or deriving a set of one or more cryptographic keys. Cryptographic key data may be represented in a human readable form (e.g., passcode, password), a non-human readable form (e.g., digital token, digital signature, or digital certificate), other form, or a combination thereof. Cryptographic key data may be input for a cryptographic function, output of a cryptographic function, or a combination thereof. Cryptographic key data may include one or more encryption keys, decryption keys, session keys, transport keys, migration keys, authentication keys, authorization keys, integrity keys, verification keys, digital tokens, license keys, certificates, signatures, hashes, other data or data structure, or a combination thereof. The cryptographic key data may include any number of cryptographic keys and may be used as part of a cryptographic system that provides privacy, integrity, authentication, authorization, non-repudiation, other features, or a combination thereof.

Computing device 110B may be referred to as an untrusted network host device. In some implementations, computing device 110B can be a standalone host computing device that communicates directly with tenant computing device 110A. In other implementations, computing device 110B can be a component of a cloud computing environment that includes multiple additional computing devices. In such instances, computing device 110B can include a cloud controller component (not pictured) that can manage some resources for the cloud computing environment. Alternatively, computing device 110B can communicate with a separate computing device that includes the cloud controller component.

Computing device 110B may include a trusted execution environment 120 (e.g., a "launcher" TEE) that can be established by the cloud controller to manage the TEE pools as described herein. TEE 120 can include a trusted execution resource manager 125 that enables TEE 120 to establish and manage the resources for one or more TEE pools 125, 126 on computing device 110B (or within a cloud computing environment that includes computing device 110B). In various implementations, trusted execution resource manager 125 can establish one or more TEE pools 125, 126 that are each provisioned using configuration parameters particular to the TEE pool. In other words, trusted execution resource manager 125 can provision TEE pool 125 with shell TEEs 125A-N, where each shell TEE 126A-N is configured with parameters associated with TEE pool 125. Similarly, trusted execution resource manager 125 can provision TEE pool 126 with shell TEEs 126-A to 126-N, where each shell TEE 126A-N is configured with parameters associated with TEE pool 126.

As described in further detail below, each shell TEEs 125A-N, and 126A-N can be provisioned as base run-time environments (e.g., a basic operating system (OS), basic container environment, basic secure enclave, etc.) into which additional components can be later installed. As such, each shell TEE can be configured without an executable application payload, which can be later provided by a requesting tenant. It should be noted that for clarity of illustration only two TEE pools have been depicted in FIG. 1. However, in other implementations, more or fewer TEE pools can be established. Additionally, while the TEE pools depicted in FIG. 1 are both in computing device 110B, in other implementations that include multiple host computing devices, TEE pools can be configured differently than depicted in FIG. 1. For example, different pools may be established on different host computing devices. Additionally or alternatively, TEE pools can be configured such that one portion of the shell TEE instances for a particular pool are established on one host computing device while another portion of the shell TEE instances for the same TEE pool is established in a different host computing device.

In various implementations, trusted execution resource manager 125 can receive a request from tenant computing device 110A to establish a trusted execution environment. The request can include one or more configuration parameters that specify the configuration of the TEE to be established for the tenant. Responsive to the request, trusted execution resource manager 125 can compare the parameters received in the request to the configuration parameters used to establish the various TEE pools 125, 126 to determine whether any of the established TEE pools are configured sufficiently to satisfy the request received from the tenant computing device 110A.

If trusted execution resource manager 125 determines that one of TEE pools 125, 126 includes shell TEEs to satisfy the request, trusted execution resource manager 125 can select a shell TEE from the applicable TEE pool and provision the selected shell TEE for the requesting tenant computing device 110A. Trusted execution resource manager 125 can establish TEE 130 using the selected shell TEE and facilitate encrypted communication between the TEE 130 and tenant computing device 110A (e.g., encrypted communication channel 162). In various implementations, tenant computing device 110A can provide the payload (e.g., executable code 134) and key information (e.g., cryptographic key 136) to be provisioned into the newly established TEE 130 for the tenant computing device 110A. Trusted execution resource manager 125 is described in further detail below with respect to FIG. 4.

Trusted execution environments 120, 130 may use encryption to isolate the data of a process (e.g., user space process, VM, container) from other processes running on the same computing device. In one example, the data of a process executing in the trusted execution environment may be encrypted using cryptographic keys provided by the tenant that are accessible to a hardware processor of the computing device but are inaccessible to all the processes running on the computing device (e.g., hardware level encryption). The hardware processor may encrypt or decrypt the data of the process executing in the trusted execution environment when the process stores or accesses the data. This enables the trusted execution environment to isolate data of a lower privileged process (e.g., application process or virtual machine process) executing within the trusted execution environment from being accessed by a higher privileged processes (e.g., kernel or hypervisor) even though the higher privileged processes may be responsible for managing the lower privileged process. Trusted execution environment may provide code execution, storage confidentiality, and integrity protection, and may store, execute, and isolate protected content from other processes executing on the same computing device, as discussed in more detail in regards to FIG. 2.

Trusted execution environments 120, 130 may be ephemeral execution environments that comprise non-persistent storage of computing device 110B and may or may not persistently store data on a persistent storage device (not pictured). The non-persistent storage may include data storage devices that lose data in response to an interruption and may include volatile memory (e.g., main memory), processor registers (e.g., CPU or GPU registers), other non-persistent cache, or a combination thereof. A persistent storage device may be internal to computing device 110B and accessible over a device bus or may be external to computing device 110B and accessible over a network connection (e.g., communication channel).

Network 160 may include one or more public networks (e.g., the internet), private networks (e.g., a local area network (LAN) or wide area network (WAN)), or a combination thereof. Network 160 may include a wired or a wireless infrastructure, which may be provided by one or more wireless communications systems, such as a wireless fidelity (WiFi) hotspot connected with the networks 160 and/or a wireless carrier system that can be implemented using various data processing equipment, communication towers, etc. In one example, network 160A may include one or more trusted networks. A trusted network may include security enhanced features that restrict access and use of network 160 to particular users and devices of an organization (e.g., intranet of a business entity). An untrusted network (e.g., intranet) may not provide the same level of security enhanced features as the trusted network and may be available for public access and use.

Communication channel 162 may include any communication channel that is capable of communicating data between computing devices and may include one or more connections. The connections may be network connections, computer-to-computer connections, peripheral connection, other connections, or a combination thereof. The network connections may be over the same network or different networks and each of the network connections may be an indirect connection that traverses one or more network nodes (e.g., access points, switches, routers, or other networking infrastructure device) and may communicably couple one of computing devices with one or more other computing devices. A computer-to-computer connection may be the same or similar to a peer-to-peer connection and may be a direct connection between computing devices (e.g., bluetooth connection, WiFi Direct, ad-hoc network connection). A peripheral connection may be a connection that uses a direct physical connection between an adapter of the computer and an adapter of the portable data storage device (e.g., Universal Serial Bus (USB) connection). The peripheral connection may exist when one of the computing devices is a computer and the other is a portable data storage device (e.g., USB drive, key fob, secure card).

Figure 2:
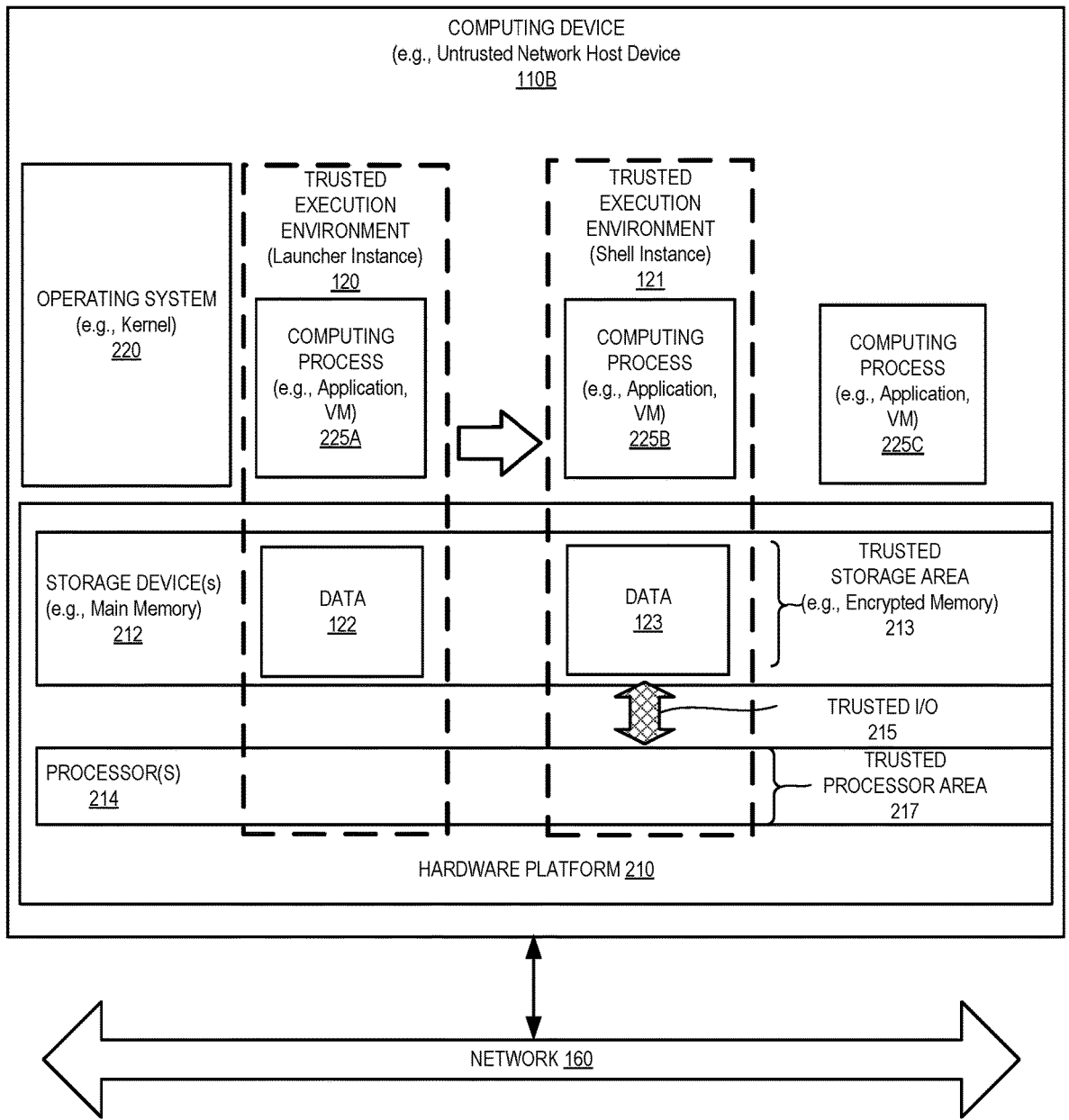
FIG. 2 depicts a block diagram of an example computing device that includes a launcher instance of a trusted execution environment that can establish pools of trusted execution environments, in accordance with one or more aspects of the present disclosure.

FIG. 2 depicts an example of a set of trusted execution environments established in computing device 110B, in accordance with an embodiment of the present disclosure. Computing device 110B may be the same or similar to one or more of computing devices 110A-B of FIG. 1 and may include a hardware platform 210, trusted execution environments 120, 121, an operating system 220, one or more computing processes 225A-C, and a network 160. It should be noted that other architectures for computing device 110B are possible, and that the implementations of the computing device utilizing embodiments of the disclosure are not necessarily limited to the specific architecture depicted.

Hardware platform 210 may include one or more hardware devices that perform computing tasks for computing device 110B. Hardware platform 210 may include one or more data storage devices, computer processors, Basic Input Output services (BIOS), code (e.g., firmware), other aspects, or a combination thereof. One or more devices of the hardware platform 210 may be combined or consolidated into one or more physical devices or may partially or completely emulated as a virtual device or virtual machine. Hardware platform 210 may include one or more storage devices 212 and processors 214.

Storage devices 212 may include any data storage device that is capable of storing data and may include physical memory devices. The physical memory devices may include volatile memory devices (e.g., RAM, DRAM, SRAM), non-volatile memory devices (e.g., NVRAM), other types of memory devices, or a combination thereof. Storage devices 212 may also or alternatively include mass storage devices, such as hard drives (e.g., Hard Disk Drives (HDD)), solid-state storage (e.g., Solid State Drives (SSD)), other persistent data storage, or a combination thereof. Storage devices 212 may be capable of storing data 122, 123 associated with one or more of the computing processes 225A-B. In one example, data of computing process 225A may be received from a device that is internal or external to computing device 110B. The data may be encrypted using a cryptographic key that was provided (e.g., determined, derived, generated, assigned) by computing device 110B or by a different computing device. The received data may be decrypted using the same cryptographic key or a derivative of the cryptographic key and the decrypted data may be loaded into the trusted execution environment 120 (as shown by data 122) before, during or after being re-encrypted.

Processors 214 may be communicatively coupled to storage devices 212 and be capable of executing instructions encoding arithmetic, logical, or I/O operations. Processors 214 may include one or more general processors, Central Processing Units (CPUs), Graphical Processing Units (GPUs), Application Specific Integrated Circuits (ASICs), secure cryptoprocessors, Secure Elements (SE), Hardware Security Module (HSM), other processing unit, or a combination thereof. Processors 214 may be a single core processor, which may be capable of executing one instruction at a time (e.g., single pipeline of instructions) or a multi-core processor, which may simultaneously execute multiple instructions. Processors 214 may interact with storage devices 212 and provide one or more features defined by or offered by trusted systems, trusted computing, trusted computing base (TCB), trusted platform module (TPM), hardware security module (HSM), secure element (SE), other features, or a combination thereof.

Processors 214 may establish a trusted execution environment across multiple hardware devices of hardware platform 210 (e.g., processor and storage devices) and may include instructions (e.g., opcodes) to initiate, configure, and maintain the trusted execution environment 120. In one example, a trusted execution environment may be implemented using Software Guard eXtensions® (SGX) provided by Intel®, Memory Encryption Technology provided by AMD® (e.g., Secure Encrypted Virtualization® (SEV), Secure Memory Encryption (SME, SME-ES), TrustZone® provided by ARM®, IBM PEF, RISC-V Sanctum, other technology, or a combination thereof.

Trusted execution environments 120, 121 may be a security enhanced area in computing device 110B that may guard the data of a computing process from being accessed by other computing processes on computing device 110B. A trusted execution environment may enhance security by enhancing confidentiality (e.g., reducing unauthorized access), integrity (e.g., reduce unauthorized modifications), availability (e.g., enable authorized access), non-repudiation (e.g., action association), other aspect of digital security or data security, or a combination thereof. Trusted execution environments 120, 121 may be the same or similar to a trust domain, trust zone, other term, or a combination hereof. Trusted execution environment 120 may protect data 122 while data 122 is in use (e.g., processed by processor 214), is in motion (e.g., transmitted over network 160), is at rest (e.g., stored in storage device 212), or a combinational thereof. Trusted execution environments 120, 121 may be a set of one or more trusted execution environments and each of the trusted execution environments may be referred to as an instance of a trusted execution environment (i.e., TEEi). Each trusted execution environment 120 may isolate data of at least one process executed in trusted execution environment 120 from processes executing external to the trusted execution environment. The at least one process may be a set of one or more processes associated with an execution construct being guarded by the trusted execution environment 120.

The execution construct may be a virtual machine, container, computing process, thread, instruction stream, or a combination thereof. In one example, trusted execution environment 120, 121 may execute a particular virtual machine (e.g. VM based TEE) and may guard data of the virtual machine from a hypervisor managing the virtual machine. In this example, computing device 110B may execute executable code in trusted execution environment 120, 121 as a virtual machine process and the executable code in the trusted execution environment may be accessible to the virtual machine process and inaccessible to a hypervisor managing the virtual machine process. As such, the trusted execution environment 120 of computing device may host a virtual machine that executes the executable data and all the data in the trusted execution environment may be accessible to the virtual machine and inaccessible to a hypervisor managing the virtual machine.

In another example, trusted execution environment 120, 121 may be associated with a particular computing process (e.g., process based TEE) and may guard data of the particular computing process from being access by other equally privileged, higher privileged, or lower privileged computing processes (e.g., guard application process against higher privileged Operating System (OS) process). In this example, computing device 110 may execute the executable code in trusted execution environment 120, 121 as one or more application processes and the executable code in the trusted execution environment 120, 121 may be accessible to the one or more application processes and inaccessible to a kernel managing the one or more application processes. As such, trusted execution environment 120, 121 of computing device 110B may host one or more application processes that execute the executable data and the data in the trusted execution environment may be accessible to the one or more application processes and be inaccessible to a kernel managing the one or more application processes. In either example, the data in the trusted execution environment 120, 121 may be guarded by storing the data 122 in a trusted storage area 213.

Trusted storage area 213 may be an area of one or more storage devices 212 that stores data of a computing process. Trusted storage area 213 may be a part of trusted execution environment 120, 121 and may store data 122 of computing process 225A in an encrypted form. Data 122 may be encrypted and decrypted by hardware devices using cryptographic input that includes one or more cryptographic keys. In one example, the cryptographic keys may be accessible to the hardware devices (e.g., processor 214) and may be inaccessible to operating system level processes executed by the hardware device. In another example, the cryptographic keys may be accessible to hardware devices and one or more computing processes, such as, the computing process associated with the trusted execution environment. In either example, the encryption and decryption performed by the hardware device may be referred to as hardware based encryption, hardware level encryption, hardware assisted encryption, hardware enforced encryption, process transparent encryption, other term, or a combination thereof and may use cryptographic key data (e.g., encryption and decryption keys) that are accessible to the processor and are inaccessible to all processes executed external to the trusted execution environment 120.

Trusted storage area 213 may include a portion of memory and may be referred to as an encrypted memory area. An encrypted memory area may be a contiguous or non-contiguous portion of virtual memory, logical memory, physical memory, other storage abstraction, or a combination thereof. The encrypted memory area may correspond to or be mapped to a portion of primary memory (e.g., main memory), auxiliary memory (e.g., solid state storage), adapter memory (e.g., memory of graphics card, or network interface cart), other persistent or non-persistent storage, or a combination thereof. In one example, the encrypted memory area may be a portion of main memory associated with a particular process and the processor may encrypt the data when storing the data in the memory area and may decrypt the data when retrieving the data from the memory area. The data in the memory area may be transformed (e.g., encrypted or decrypted) before, during, or after it is stored in or retrieved from the memory area and may remain in an encrypted form while in the encrypted memory area.

Trusted storage area 213 may store the data in one or more storage units. The storage units may be logical or physical units of data storage for managing the data (e.g., storing, organizing, or accessing the data). A storage unit may include a contiguous or non-contiguous sequence of bytes or bits. In one example, a storage unit may be a virtual representation of underlying physical storage units, which may be referred to as physical storage blocks. Storage units may have a unit size that is the same or different from a physical block size provided by an underlying hardware resource. The storage unit may include volatile or non-volatile data storage. In one example, storage units may be a memory segment and each memory segment may correspond to an individual memory page, multiple memory pages, or a portion of a memory page. In other examples, each of the storage units may correspond to a portion (e.g., block, sector) of a mass storage device (e.g., hard disk storage, solid state storage). The data in the storage units of trusted storage area 213 may be transmitted to other hardware devices using trusted IO 215.

Trusted IO 215 may enable the data of a computing process to be transmitted between hardware devices in a security enhanced manner. The data may be transmitted over one or more system buses, networks, or other communication channel in an encrypted or partially encrypted form. This may be advantageous because transmitting the data in an encrypted form may limit the ability of the data to be snooped while being transmitted between hardware devices. As shown in FIG. 2, trusted IO 215 may enable the data of computing process 225A to be transmitted between trusted storage area 213 and trusted processor area 217.

Trusted processor area 217 may be a portion of processor 214 that is associated with computing process 225A and guards data of computing process 225 from being accessed or modified by computing processes 225B. Trusted processor area 217 may include a portion of processor 214 that stores the data (e.g., CPU cache, processor memory or registers) and a portion of processor 214 that executes the data (e.g., processor core). Trusted processor area 217 may store the data in an encrypted form or in a decrypted form when it is present on the processor and in either example, the data of the computing process may be protected from being accessed or modified by other processes via the design of the processor and encryption may not be required to ensure isolation of the data when the data is within the processor packaging (e.g., chip packaging).

Computing device 110B may use the same processor and storage device to establish multiple instances of trusted execution environment 120. Each instance of a trusted execution environment (e.g., TEE instance, TEEi) may be established for a particular set of one or more computing processes and may be associated with a particular memory encrypted area. The instances of a trusted execution environment may be provided by the same hardware (e.g., processor and memory) but each instance may be associated with a different memory encrypted area and a different set of one or more processes (e.g., set including an individual process or set of all processes of a VM). Each instance may guard all data of a computing process or a portion of the data of a computing process. For example, computing process 225A (e.g., application or VM) may be associated with both a trusted execution environment and an untrusted execution environment. In this situation, a first portion of the data of computing process 225A may be stored and/or executed within trusted execution environment 120 and a second portion of the data of computing process 225A may be stored and/or executed within an untrusted execution environment. The second portion may be stored in the same storage device as the first portion but the second portion may be stored in a decrypted form and may be executed by processor 214 in a manner that enables another process (e.g., multiple higher privileged processes) to access or modify the data. In either example, trusted execution environment may be used to execute one or more of the computing processes 225A-B.

Each of the computing processes 225A-B may include one or more streams of execution for executing programmed instructions. A stream of instructions may include a sequence of instructions that can be executed by one or more processors. Each of the computing processes may be managed by an operating system 220 or may part of an operating system (e.g., kernel, not shown). In one example, a computing process may be an instance of a computer program that is being executed and may contain program code (e.g., executable code, executable data) and a state of the current activity. Multiple computing processes may be executed concurrently by a processing device that supports multiple processing units. The processing units may be provided by multiple processors or from a single processor with multiple cores or a combination thereof. A computing process may include one or more computing threads, such as a system thread, user thread, or fiber, or a combination thereof. A computing process may include a thread control block, one or more counters and a state (e.g., running, ready, waiting, start, done).

Computing processes 225A-B may correspond to one or more applications, containers, virtual machines, secure enclaves, or a combination thereof. Applications may be programs executing with user space privileges and may be referred to as application processes, system processes, services, background processes, or user space processes. A user space process (e.g., user mode process, user privilege process) may have lower level privileges that provide the user space process access to a user space portion of data storage without having access to a kernel space portion of data storage. In contrast, a kernel process may have higher privileges that provide the kernel process access to a kernel space portion and to user space portions that are not guarded by a trusted execution environment. In one example, the privilege associated with a user space process may change during execution and a computing process executing in user space (e.g., user mode, user land) may be granted enhanced privileges by an operating system and function in kernel space (e.g., kernel mode, kernel land). This may enable a user space process to perform an operation with enhanced privileges. In another example, the privilege associated with a user space process may remain constant during execution and the user space process may request an operation be performed by another computing process that has enhanced privileges (e.g., operating in kernel space).

The privilege levels of a computing process may be the same or similar to protection levels of processor 214 (e.g., processor protection rings) and may indicate an access level of a computing process to hardware resources (e.g., virtual or physical resources). There may be multiple different privilege levels assigned to the computing process. In one example, the privilege levels may correspond generally to either a user space privilege level or a kernel privilege level. The user space privilege level may enable a computing process to access resources assigned to the computing process but may restrict access to resources assigned to another user space or kernel space computing process. The kernel space privilege level may enable a computing process to access resources assigned to other kernel space or user space computing processes. In another example, there may be a plurality of privilege levels, and the privilege levels may include a first level (e.g., ring 0) associated with a kernel, a second and third level (e.g., ring 1-2) associated with device drivers, and a fourth level (e.g., ring 3) that may be associated with user applications.

Operating system 220 may include one or more programs that are run to manage one or more of the computing processes 225A-B. Operating system 220 may include a kernel that execute as one or more kernel processes and may manage access to physical or virtual resources provided by hardware devices. A kernel process may be an example of a computing process associated with a higher privilege level (e.g., hypervisor privilege, kernel privilege, kernel mode, kernel space, protection ring 0). In one example, operating system 220 may be a host operating system, guest operating system, or a portion thereof and the computing processes 225A-C may be different applications that are executing as user space processes. In another example, operating system 220 may be a hypervisor that provides hardware virtualization features and the computing processes 225A-B may be different virtual machines. In yet another examples, operating system may include a container runtime (e.g., Docker, Container Linux) that provides operating system level virtualization and the computing processes 225A-B may be different containers. In further examples, operating system 220 may provide a combination thereof (e.g., hardware virtualization and operating system level virtualization).

The kernel of operating system 220 may segregate storage devices 212 (e.g., main memory, hard disk) into multiple portions that are associated with different access privileges. At least one of the multiple portions may be associated with enhanced privileges and may be accessed by processes with enhanced privileges (e.g., kernel mode, kernel privilege) and another portion may be associated with diminished privileges and may be accessed by processes with both diminished privileges (e.g., user space mode, user space privilege) and those with enhanced privileges. In one example, the portion of storage devices 212 associated with the enhanced privileges may be designated as kernel space and the portion of storage devices 212 associated with the diminished privileges may be designated as user space. In other examples, there may be more or less than two portions.

When the kernel provides features of a hypervisor it may also be known as a virtual machine monitor (VMM) and may provide virtual machines with access to one or more features of the underlying hardware devices. A hypervisor may run directly on the hardware of computing device 110B (e.g., host machine) or may run on or within a host operating system (not shown). The hypervisor may manage system resources, including access to hardware devices. The hypervisor may be implemented as executable code and may emulate and export a bare machine interface to higher-level executable code in the form of virtual processors and guest memory. Higher-level executable code may comprise a standard or real-time operating system (OS), may be a highly stripped down operating environment with limited operating system functionality and may not include traditional OS facilities, etc.

Figure 3:
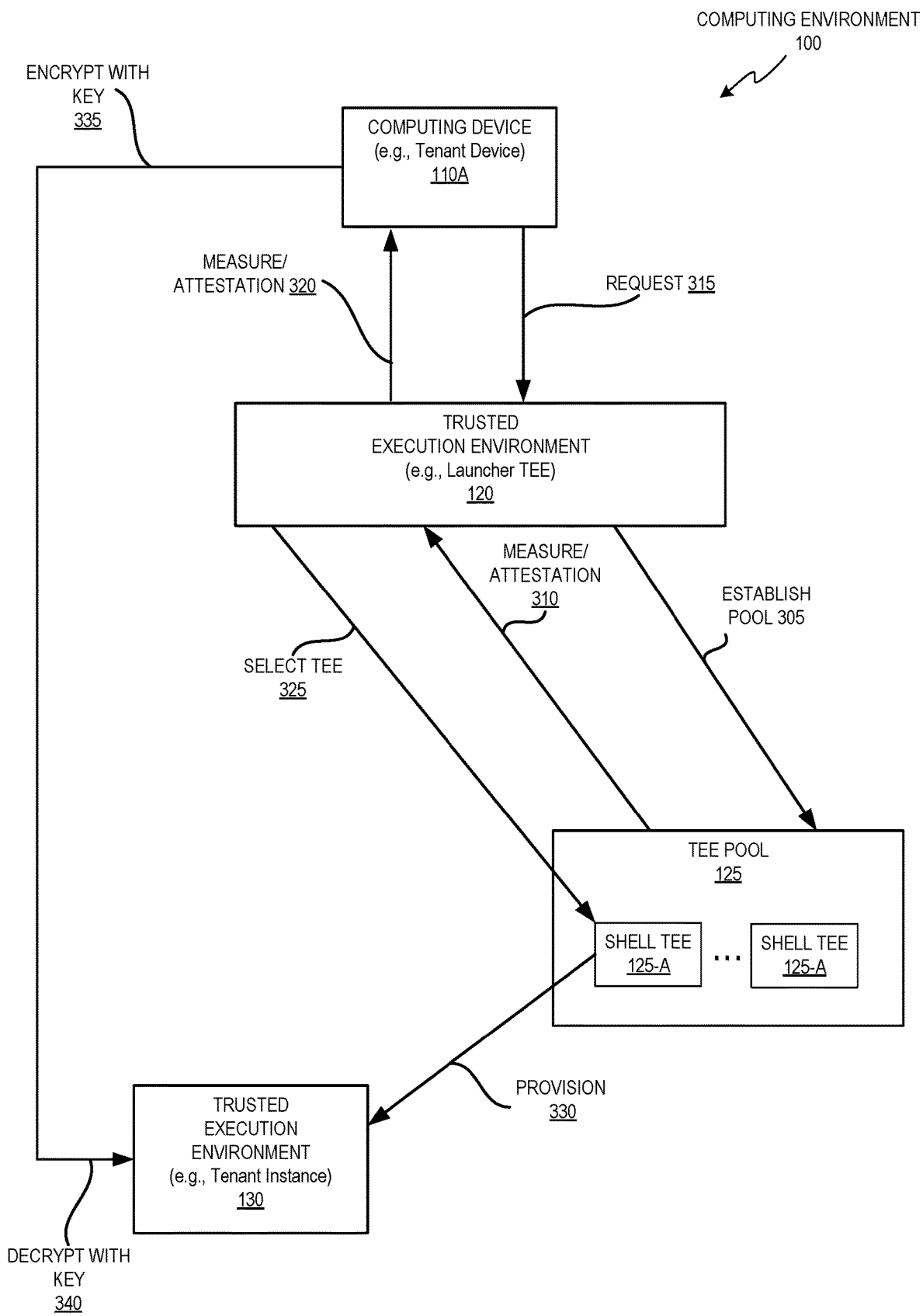
FIG. 3 depicts an illustration of a facilitating resource sharing for trusted execution environments, in accordance with one or more aspects of the present disclosure.

FIG. 3 depicts an illustration of a facilitating resource sharing for trusted execution environments. As shown in FIG. 3, the launcher TEE 120 can establish TEE pool 125 that includes shell TEEs 125A-N (e.g., establish pool 305). As described in further detail below with respect to FIG. 4, the launcher TEE can perform measurement/attestation operations to authenticate the shell TEEs in TEE pool 125 (e.g., measurement/attestation 310).

In various implementations measurement/attestation 310 can be performed to verify the integrity of the untrusted computing device which will host any of the shell TEEs in TEE pool 125 (e.g., host computing device 110B of FIG. 1). Measurement/Attestation 310 can enable a program to check the capabilities of computing device 110B and to detect unauthorized changes to programs, hardware devices, other portions of computing device, or a combination thereof. The unauthorized changes may be the result of malicious, defective, or accidental actions by a program or hardware device. The attestation may involve performing local attestation, remote attestation, or a combination thereof. Local attestation may involve enabling a program executed locally on computing device 110B to verify the integrity of computing device 110B. Remote attestation may involve enabling a program executed remotely on a different computing device (e.g., 110A) to verify the integrity of computing device 110B. The remote attestation may be performed non-anonymously by disclosing data that uniquely identifies computing device 110B or anonymously without uniquely identifying computing device 110B (e.g., Direct Anonymous Attestation (DAA)). In either example, one or more attestation operations may be performed to determine attestation data and may transmit attestation data to the programs executing on the local or remote computing devices for verification.

Attestation data may be based on the configuration of computing device 110B and may represent the capabilities of the hardware platform, trusted execution environment, executable code, or a combination thereof. Attestation data obtained or generated by the hardware platform (e.g., processor, memory, firmware, BIOS) and be the same or similar to integrity data (e.g., hash or signature of executable code), identification data (e.g., processor model or instance), cryptographic data (e.g., signature keys, endorsement keys, session keys, encryption or decryption keys, authentication keys), measurement data, report data, configuration data, settings data, other data, or a combination thereof. In one example, determining the attestation data may involve attestation chaining in which attestation data of different portions of computing device 110B may be combined before, during, or after being obtained. This may involve determining attestation data for one or more layers of the computing device 110B and the layers may correspond to hardware device layer (e.g., hardware platform attestation data), program layer (e.g., code attestation data), other layer, or a combination thereof.

The program that receives the attestation data may use the attestation data to verify the capabilities of computing device 110B. The program may execute a verification function to verify the computing device 110B in view of the attestation data. The verification function may take as input the attestation data and provide output that indicates whether the computing device 110B is verified (e.g., trusted). In one example, the attestation data may include integrity data (e.g., a message authentication code (MAC)) and the verification function may analyze a portion of attestation data to generate validation data. The verification function may then compare the received integrity data with the generated validation data to perform the attestation (e.g., compare received MAC with generate MAC).

Once measurement/attestation 310 of the TEE pool 125 has completed, launcher TEE 120 can service requests from tenant computing devices to establish TEEs. In various implementations, launcher TEE 120 can additionally preserve its execution state for later use to validate (e.g., measurement/attestation) itself with a requesting tenant computing device 110A.

As shown in FIG. 3, launcher TEE 120 can receive a request to establish a TEE for tenant computing device 110A (e.g., request 315). In various implementations, tenant computing device 110A can perform authentication operations (e.g., measure/attestation 320) to authenticate the launcher TEE 120. Notably, the authentication operations are performed using the initial state of the launcher TEE 120 that was previously stored. This, in turn, can satisfy the authentication for any shell TEE 125A-N that is provisioned for the tenant computing device 110A.

As noted above, the request 315 can include configuration parameters from the tenant computing device 110A that specify how the requested TEE is to be configured. Launcher TEE 120 then compares the configuration parameters received in the request to the configuration parameters of TEE pool 125 (or any other TEE pool configured by the host computing device supported by launcher TEE 120). Launcher TEE 120 can then determine if the configuration parameters of the shell TEEs in TEE pool 125 are sufficient to satisfy the request. If so, launcher TEE 120 can select one of the shell TEEs 125A-N from TEE pool 125 to be provisioned to service the request (e.g., select TEE 325).

As shown, shell TEE 125-A can be selected from the pool and established as TEE 130 (e.g., provision 330). In various implementations, the tenant computing device 110A can provide an executable payload and/or cryptographic key information that can be used to provision TEE 130. The executable payload provided to TEE 130 can establish secure communication with the tenant computing device 110A. In an illustrative example, tenant computing device 110A can encrypt data (depicted as "encrypt with key 335") and provide the encrypted data directly to TEE 130. TEE 130 can subsequently utilize the stored cryptographic key data received from TEE 120 (which was provided to TEE 120 by the tenant) to decrypt the encrypted data (depicted as "decrypt with key 340"). Additionally, data can be encrypted by TEE 130 and provided to the tenant computing device 110A, which can decrypt the data using the corresponding decryption key.

Figure 4:
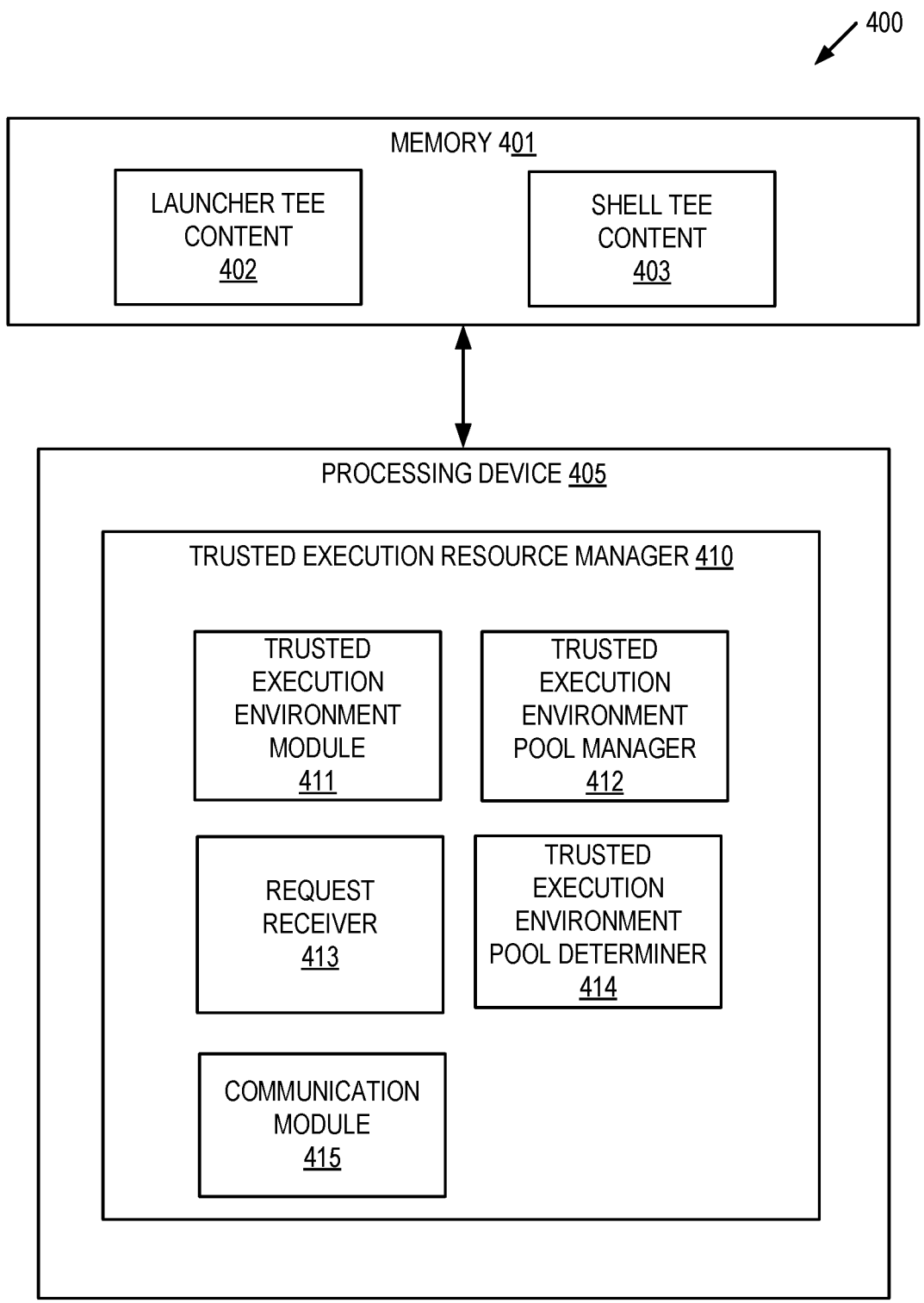
FIG. 4 depicts a block diagram illustrating an example of a trusted execution resource manager that facilitates resource sharing for trusted execution environments, in accordance with one or more aspects of the present disclosure.

FIG. 4 depicts a block diagram illustrating an example of a trusted execution resource manager 410 for facilitating resource sharing for trusted execution environments. In some implementations, trusted execution establishment component 410 may correspond to trusted execution establishment component 112 of FIG. 1. As shown in FIG. 4, trusted execution resource manager 410 may be a component of a computing apparatus 400 that includes a processing device 405, operatively coupled to a memory 401, to execute trusted execution resource manager 410. In some implementations, processing device 405 and memory 401 may correspond to processing device 602 and main memory 604 respectively as described below with respect to FIG. 6. In various implementations, computing apparatus 400 can be a standalone host computing device that communicates with various tenant computing devices. Alternatively, computing apparatus 400 can be a component of a cloud computing environment made up of multiple host computing devices, an Internet of Things (IoT) edge device, or the like.

Trusted execution resource manager 410 may include trusted execution environment module 411, trusted execution environment pool manager 412, request receiver 413, trusted execution environment pool determiner 414, and communication module 415. Alternatively, the functionality of one or more of trusted execution environment module 411, trusted execution environment pool manager 412, request receiver 413, trusted execution environment pool determiner 414, and communication module 415 may be combined into a single module or divided into multiple sub-modules.

Trusted execution environment module 411 is responsible for establishing an initial trusted execution environment (TEE) instance (e.g., a "launcher" TEE instance) in computing apparatus 400 (e.g., an untrusted host computing device). In various implementations, computing apparatus 400 (e.g., the host computing device) can generate a shell TEE and provision the shell with trusted execution resource manager 410. Subsequently, trusted execution environment module 411 can be invoked to configure the remaining components of the launcher TEE. As described in further detail below, trusted execution environment module 411 can additionally be invoked to establish the shell TEEs for the TEE pools, and also to further configure a shell TEE with any additional parameters and or executable components received from a requesting tenant computing device.

Trusted execution environment module 411 can perform measurement and attestation for the launcher TEE instance prior to establishing any subsequent sell TEE instances for the TEE pools. In some implementations, trusted execution environment module 411 can perform these operations utilizing methods/operations that are specific to the hardware platform and/or vendor. In an illustrative example, trusted execution environment module 411 can perform measurement of the launcher TEE instance by performing a hash operation over the contents of the launcher TEE instance that can be subsequently signed by the applicable mechanism utilized by the platform and/or vendor.

Trusted execution environment module 411 can then perform an attestation to verify the integrity of the host apparatus 400 (e.g., integrity of the hardware platform, operating system, and/or one or more of processing devices 405). As noted above, attestation can enable a program to check the capabilities of the computing device (e.g., computing device 110B, apparatus 400, etc.) and to detect unauthorized changes to programs, hardware devices, other portions of the computing device, or a combination thereof. The unauthorized changes may be the result of malicious, defective, or accidental actions by a program or hardware device. The attestation may involve performing local attestation, remote attestation, or a combination thereof. In either instance, one or more attestation operations can be performed to determine attestation data and may transmit the attestation data to the programs executing on the local or remote computing devices for verification.

Notably, trusted execution environment module 411 can perform the measurement and attestation of the launcher TEE instance and save the measurement in memory 401 (e.g., launcher tee content 402). In various implementations, the saved measurement information can be used by request receiver 413 when providing validation information to a tenant that requests a TEE from one of the TEE pools. As such, if the tenant validates the launcher TEE instance using the measurement information, it can subsequently accept as valid any TEE from the TEE pools provisioned by the launcher TEE instance. In other words, because the tenant knows it can trust the launcher TEE instance (using the measurement data stored by the launcher TEE instance), it knows it can also trust anything from the TEE pools that is created and validated by the launcher TEE instance.

Trusted execution environment pool manager 412 is responsible for establishing one or more pools of shell TEEs. In various implementations, a shell TEE can represent the basics of an operating system (OS), the basics of a shell container environment, the basics of a secure enclave, or the like. In other words, the shell TEE can be configured as a base run-time environment without including a specific executable payload or specific tenant configuration. Thus, the shell TEE can provide the base run-time environment into which additional components can be installed when requested and/or provided by a tenant computing device. The shell TEE can be provisioned such that it can support any payload provided by the tenant that is suitable for the OS or container type for a particular pool.

In various implementations, trusted execution environment pool manager 412 can configure a pool of shell TEEs in view of one or more configuration parameters associated with the set of shell TEEs. Accordingly, each of the shell TEEs in a particular TEE pool can be configured with the configuration parameters associated with the pool. In various implementations, a TEE pool can be configured in view of parameters such as OS type (e.g., Red Hat™ Linux, Suse™ Linux, Ubuntu™ Linux, Unix, Microsoft Windows™, MacOS™, etc.), an OS executable component (e.g., a web server, a file transfer protocol (FTP) server, a firewall component, etc.), a memory parameter (e.g., an amount of memory), a processor parameter (e.g., a number of CPUs, etc.) or other similar parameter for configuring the TEE. For example, trusted execution environment pool manager 412 can establish a pool of shell TEEs that are configured to execute the Red Hat™ Linux OS. Thus, each shell TEE in that pool would be configured with the basic run-time elements of the Red Hat™ Linux OS environment. Similarly, trusted execution environment pool manager 412 can establish a separate pool of shell TEEs that are configured to execute the Ubuntu™ OS. Thus each shell TEE in that pool would be configured with the basic run-time elements of the Ubuntu™ OS environment.

In some implementations, the shell TEE pools can be established within apparatus 400 (e.g., a single host computing device). Alternatively, the TEE pools can be established across multiple different host computing devices. For example, in cloud computing environments, the TEE pools can be established across multiple computing devices within the cloud computing environment. In this latter case, TEE pools can be separated by type across different host computing devices. For example, a pool of Red Hat™ Linux shell TEEs can be established on one host computing device, and a pool of Ubuntu™ Linux shell TEEs can be established on a different host computing device. Alternatively, the TEE pools can be established such that each host computing device includes a portion of each pool of TEEs. In other words, one host computing device can be provisioned with a portion of a pool of Red Hat™ Linux shell TEEs, a portion of the pool of Ubuntu™ TEEs, etc. In this implementation, trusted execution environment pool manager 412 can track the overall pool sizes and the host computing devices that include the shell TEEs associated with each pool.

Trusted execution environment pool manager 412 can establish the TEE pools using configuration information that indicates the types of TEE pools to provision as well as the number of shell TEE instances to establish for each TEE pool. In some implementations, trusted execution environment pool manager 412 can receive this configuration information from another component of apparatus 400. Alternatively, trusted execution environment pool manager 412 can determine the configuration information by analyzing system usage information that tracks the types of TEEs utilized by tenant computing devices. In such instances, trusted execution environment pool manager 412 can analyze the system usage history and determine the ratio of different TEE types and configure the different TEE pools based on this information. For example, if stored system usage information indicates that tenants request Red Hat™ Linux TEEs at double the rate of Ubuntu™ Linux TEEs, trusted execution environment pool manager 412 can configure a Red Hat™ Linux TEE pool with twice the number of shell TEE instances as an Ubuntu™ Linux TEE pool.

In some implementations, trusted execution environment pool manager 412 can authenticate each shell TEE in the established TEE pools. In such instances, trusted execution environment pool manager 412 can perform measurement and attestation operations on each shell TEE and store the measurement information (e.g., shell TEE content 403) that can be subsequently used when provisioning the shell TEEs for a requesting tenant. For example, when provisioning a Red Hat™ Linux TEE pool, trusted execution environment pool manager 412 can validate that each shell TEE environment uses the Red Hat™ Linux OS and store that validated information in memory 401. In some implementations, trusted execution environment pool manager 412 can maintain an encrypted connection to each shell TEE in the TEE pools. In such instances, trusted execution environment pool manager 412 can establish the connection using an initial key exchange between the launcher TEE instance and the TEE pools. Notably, when a shell TEE is subsequently provisioned for a tenant computing device, the tenant can establish a secure communication channel with its assigned TEE by replacing the key information used by the launcher with the tenants own cryptographic key information.

Request receiver 413 is responsible for receiving a request from a tenant computing device to establish a TEE for the tenant. In various implementations, the tenant can device can be a trusted device that communicates with computing apparatus 400 (e.g., an untrusted host device). Request receiver 413 can receive the request from the tenant that specifies the type of TEE to establish. In such instances, the request can include one or more request parameters that indicate the type of TEE (e.g., parameters similar to those used by trusted execution environment pool manager 412 when configuring the TEE pools). For example, the request can include an OS type, an OS executable component type, a memory parameter, a processor parameter, or the like.

In some implementations, request receiver 413 can determine, using information included in the request, whether to establish the TEE within computing apparatus 400 or any additional hosts associated with computing apparatus 400. For example, the tenant can specify in the request where to establish the requested TEEs with which the tenant wishes to communicate. Additionally, request receiver 413 can determine whether to establish multiple TEEs for the tenant based on the information received in the request.

Request receiver 413 can additionally facilitate validation between the launcher TEE and the requesting tenant. In such instances, request receiver 413 can perform measurement and attestation operations using the measurement information for the launcher TEE instance that was determined and stored during the start up of the launcher TEE (e.g., launcher TEE content 402). Thus, while the state of the launcher TEE may have changed, the validation is based on the original state at start up. Since the trusted execution resource manager 410 executes within a TEE itself (the launcher TEE), it is known to be in a validated state by the requesting tenant. As noted above, because the tenant knows it can trust the launcher TEE, it knows it can also trust anything created by the launcher TEE. Thus, additional validation of the TEE selected from the pool can be bypassed (since any TEE selected from a pool was established by the validated launcher TEE).

Trusted execution environment pool determiner 414 is responsible determining whether any of the configured TEE pools satisfy the request received by request receiver 413. In various implementations, trusted execution environment pool determiner 414 can make this determination by analyzing the request parameters received from the tenant computing device and comparing them to the configuration parameters for each of the established pools. Trusted execution environment pool determiner 414 can subsequently determine whether any of the TEE pool configurations satisfy the parameters received in the request. In various implementations, a TEE pool configuration can satisfy a request by satisfying all parameters in the request. Alternatively, a TEE pool configuration can satisfy a request based on the priority of the parameters. In other words, if a TEE pool does not satisfy all of the parameters received in the request, but satisfies any required parameters, trusted execution environment pool determiner 414 can select a shell TEE from that TEE pool.

Responsive to determining that the configuration parameters of a particular TEE pool satisfy the request parameters of a request, trusted execution environment pool determiner 414 can invoke trusted execution environment module 411 to establish a TEE for the tenant using a shell TEE from the identified TEE pool. In various implementations, trusted execution environment pool determiner 414 can select a shell TEE from the identified pool by invoking trusted execution environment pool manager to remove the shell TEE from the pool (e.g., update the configuration information associated with that particular pool to reduce the number of shell TEE instances associated with that pool) and provide information associated with the selected shell TEE so that the shell TEE can be fully provisioned for the tenant. Trusted execution environment module 411 can subsequently configure the selected shell TEE using the parameters received in the request that may be specific to the requesting tenant.

Communication module 415 is responsible for causing the newly established TEE instance to communicate with the requesting tenant computing device. In some implementations, as noted above, the communication connection is established after the measurement/attestation operations have been conducted between the tenant and launcher TEE. Subsequently, cryptographic key information can be received from the tenant that can be used to establish the secure communication channel between the tenant and the new TEE instance. Once communication has been established, the tenant can provide any executable code to the assigned TEE instance. Alternatively, the tenant can provide any executable code to the launcher TEE prior to direct communication with the assigned TEE instance. The launcher TEE can provision the selected shell TEE instance with the provided executable code and then facilitate the communication connection between the tenant and the fully provisioned TEE instance.

In some implementations, trusted execution environment pool manager 412 can continually monitor the status of the various TEE pools established in apparatus 400 (and/or the other host computing devices with TEE pools that communicate with apparatus 400) to balance the shell TEE instances in each pool. For example, trusted execution environment pool manager 412 can determine the number of shell TEEs in a particular pool. Subsequently, trusted execution environment pool manager 412 can determine whether the number of shell TEE instances in the selected pool falls below a minimum threshold. If so, trusted execution environment pool manager 412 can establish one or more additional shell TEE instances configured for that pool until the number of shell TEE instances in the pool satisfies the minimum threshold. Similarly, if the number of shell TEE instances remains at a particular level for a threshold period of time without being accessed (e.g., no shell TEE instances have been used from a particular TEE pool for a period of time), trusted execution environment pool manager 412 can remove one or more shell TEE instances from that TEE pool to free up resources for another TEE pool or another process executing in apparatus 400.

Figure 5:
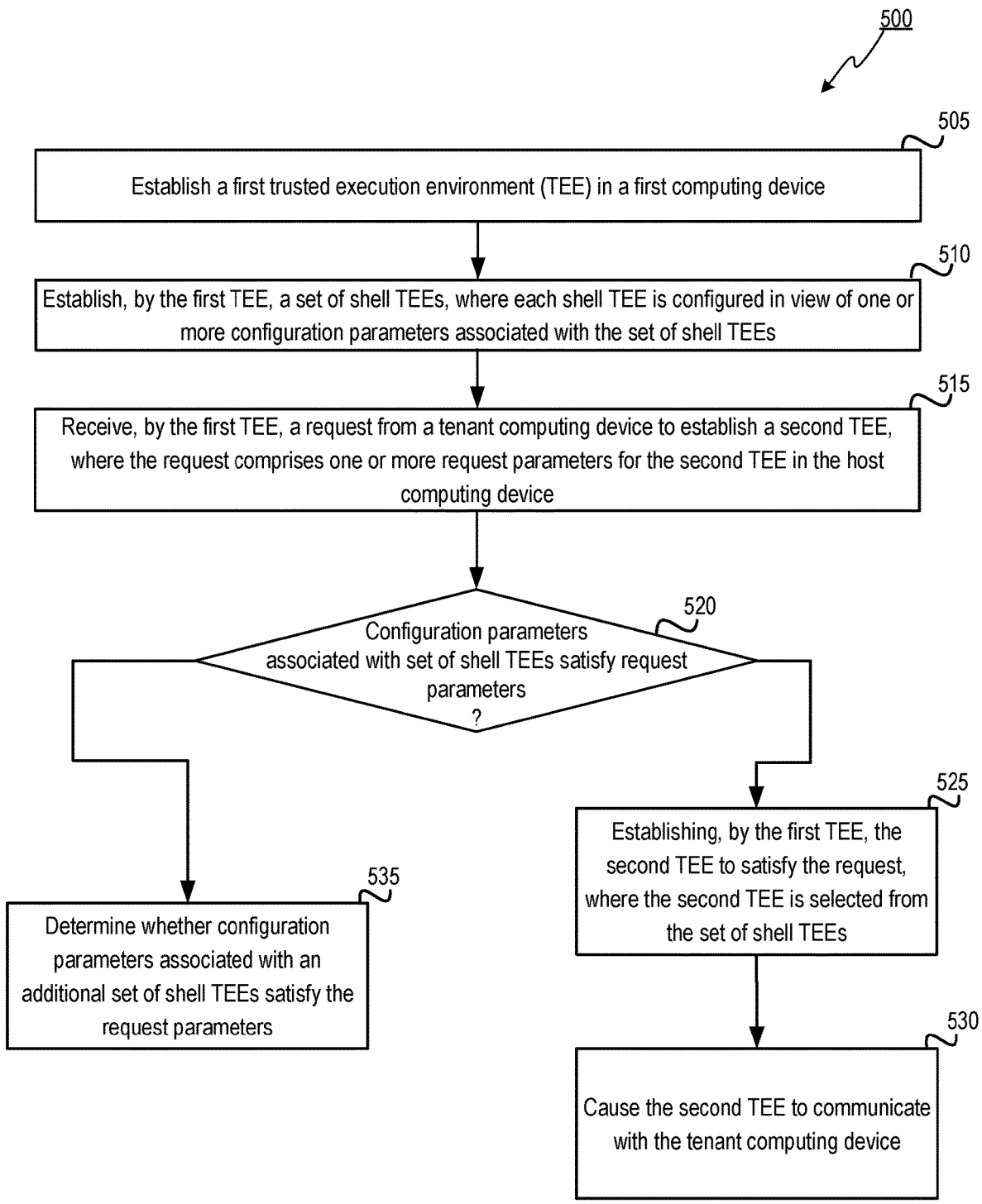
FIG. 5 depicts a flow diagram of a method for facilitating resource sharing for trusted execution environments, in accordance with one or more aspects of the present disclosure.

FIG. 5 depicts a flow diagram of an example method 500 for facilitating resource sharing for trusted execution environments. The method may be performed by processing logic that may comprise hardware (circuitry, dedicated logic, etc.), computer readable instructions (run on a general purpose computer system or a dedicated machine), or a combination of both. In an illustrative example, method 500 may be performed by trusted resource manager 125 in FIG. 1 or trusted execution resource manager 410 in FIG. 4. Alternatively, some or all of method 500 might be performed by another module or machine. It should be noted that blocks depicted in FIG. 5 could be performed simultaneously or in a different order than that depicted.

At block 505, processing logic establishes, by a processing device of a first computing device, a first trusted execution environment (TEE) in the first computing device. At block 510, processing logic establishes, by the first TEE, a set of shell TEEs, wherein each shell TEE is configured in view of one or more configuration parameters associated with the set of shell TEEs. At block 515, processing logic receives, by the first TEE, a request from a tenant computing device to establish a second TEE, wherein the request comprises one or more request parameters for the second TEE in the host computing device.

At block 520, processing logic determines, by the first TEE, whether the configuration parameters associated with the set of shell TEEs satisfy the one or more request parameters for the second TEE. If so, processing continues to block 525. At block 525, processing logic establishes, by the first TEE, the second TEE to satisfy the request, wherein the second TEE is selected from the set of shell TEEs. At block 530, processing logic causes, by the first TEE, the second TEE to communicate with tenant computing device.

If at block 520 processing logic determines that the configuration parameters associated with the set of shell TEEs do not satisfy the one or more request parameters for the second TEE, processing proceeds to block 535. At block 535, processing logic determines whether the configuration information parameters associated with an additional set of shell TEEs satisfy the request parameters. For example, processing logic can examine the configuration parameters of other TEE pools and determine whether any of the other TEE pools are configured with shell TEEs that can satisfy the received request.

Figure 6:
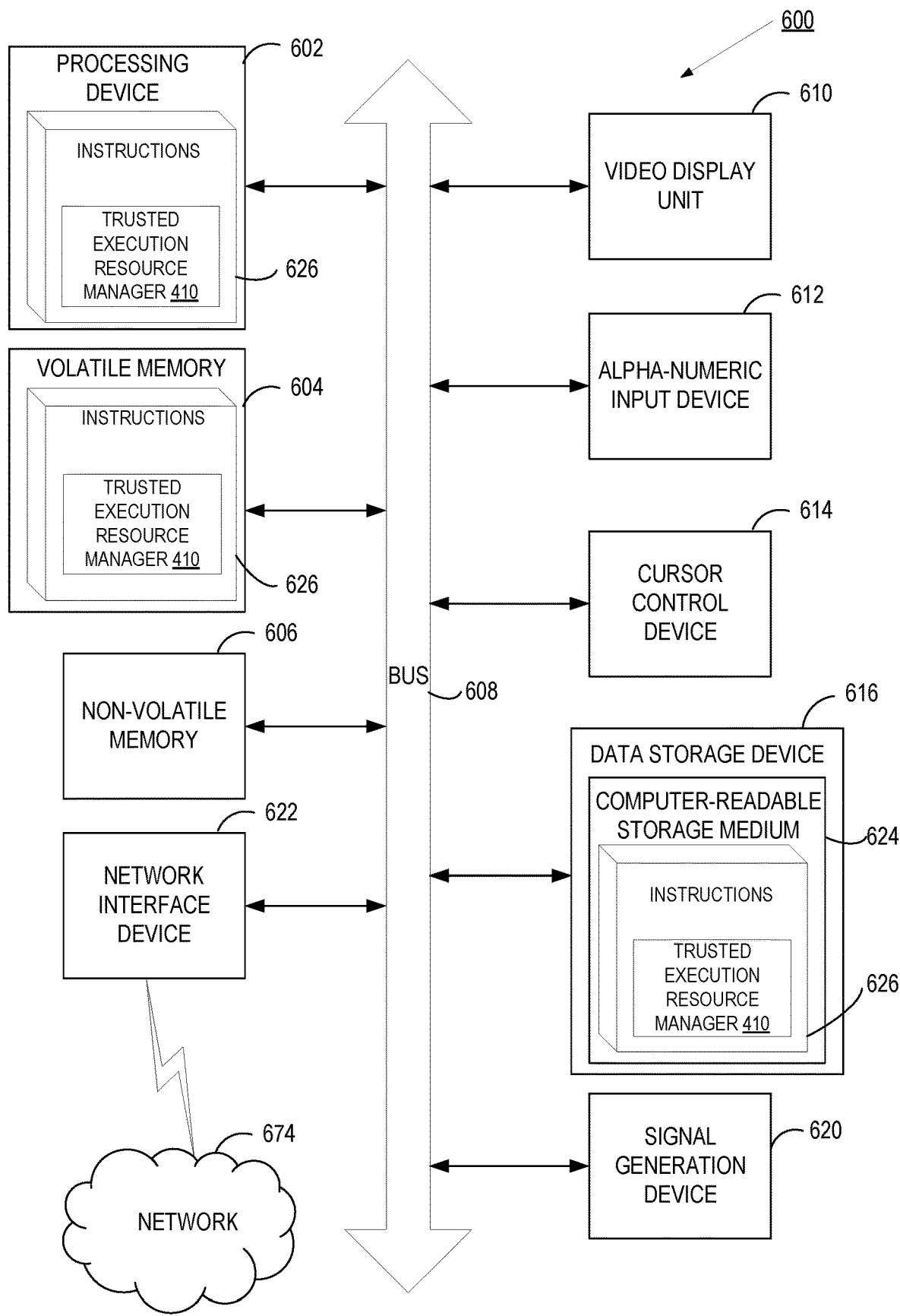
FIG. 6 depicts a block diagram of an illustrative computer system operating in accordance with one or more aspects of the present disclosure.

FIG. 6 depicts a block diagram of a computer system operating in accordance with one or more aspects of the present disclosure. In various illustrative examples, computer system 600 may correspond to computing device 110A-B of FIG. 1, and/or apparatus 400 if FIG. 4. Computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing method 500, and for encoding components 410.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "establishing," "providing," "causing," "determining," "terminating," "performing," "executing," "configuring," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements (e.g., cardinal meaning) and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
establishing, by a processing device of a first computing device, a first trusted execution environment (TEE) in the first computing device;
establishing, by the first TEE, a set of shell TEEs, wherein each shell TEE is configured in view of one or more configuration parameters associated with the set of shell TEEs;
receiving, by the first TEE, a request from a second computing device to establish a second TEE, wherein the request comprises one or more request parameters for the second TEE in the first computing device;
determining, by the first TEE, whether the configuration parameters associated with the set of shell TEEs satisfy the one or more request parameters for the second TEE; and
responsive to determining that the configuration parameters associated with the set of shell TEEs satisfy the one or more request parameters for the second TEE,
establishing, by the first TEE, the second TEE to satisfy the request, wherein the second TEE is selected from the set of shell TEEs; and
causing, by the first TEE, the second TEE to communicate with the second computing device.

2. The method of claim 1, wherein the one or more configuration parameters comprise at least one of an operating system (OS) type, an OS executable component, a memory parameter, or a processor parameter.

3. The method of claim 1, wherein the set of shell TEEs is established in the first computing device.

4. The method of claim 1, wherein establishing the second TEE to satisfy the request comprises:
selecting a first shell TEE from the set of shell TEEs;
removing the first shell TEE from the set of shell TEEs;
configuring the first shell TEE in view of the request parameters; and
establishing the second TEE using the first shell TEE.

5. The method of claim 1, wherein the second computing device communicates with a cloud computing environment that comprises the first computing device and a third computing device.

6. The method of claim 5, wherein a first portion of the set of shell TEEs is established in the first computing device and a second portion of the set of shell TEEs is established in the second computing device.

7. The method of claim 1, further comprising:
establishing, by the first TEE, an additional set of shell TEEs, wherein each additional shell TEE of the additional set of shell TEEs is configured in view of one or more additional configuration parameters associated with the additional set of shell TEEs.

8. The method of claim 7, further comprising:
responsive to determining that the configuration parameters associated with the set of shell TEEs does not satisfy the one or more request parameters for the second TEE,
determining, by the first TEE, whether the additional configuration parameters associated with the additional set of shell TEEs satisfy the one or more request parameters for the second TEE; and
responsive to determining that the additional configuration parameters associated with the additional set of shell TEEs satisfy the one or more request parameters for the second TEE,
establishing, by the first TEE, the second TEE to satisfy the request, wherein the second TEE is selected from the additional set of shell TEEs; and
causing, by the first TEE, the second TEE to communicate with the second computing device.

9. The method of claim 1, further comprising:
determining a number of shell TEEs in the set of shell TEEs;
responsive to determining that the number of shell TEEs satisfies a low threshold, establishing, by the first TEE, an additional shell TEE for the set of shell TEEs, wherein the additional shell TEE is configured in view of the one or more configuration parameters associated with the set of shell TEEs.

10. A system comprising:
a memory; and
a processing device operatively coupled to the memory, the processing device to:
establish a first trusted execution environment (TEE) in a first computing device;
establish, by the first TEE, a set of shell TEEs, wherein each shell TEE is configured in view of one or more configuration parameters associated with the set of shell TEEs;
receive, by the first TEE, a request from a tenant computing device to establish a second TEE, wherein the request comprises one or more request parameters for the second TEE in the first computing device;
determine, by the first TEE, whether the configuration parameters associated with the set of shell TEEs satisfy the one or more request parameters for the second TEE; and
responsive to determining that the configuration parameters associated with the set of shell TEEs satisfy the one or more request parameters for the second TEE,
select a shell TEE from the set of shell TEEs to satisfy the request;
establish the second TEE in view of the selected shell TEE; and
cause, by the first TEE, the second TEE to communicate with the tenant computing device.

11. The system of claim 10, wherein the tenant computing device communicates with a cloud computing environment that comprises the first computing device and a second computing device.

12. The system of claim 11, wherein a first portion of the set of shell TEEs is established in the first computing device and a second portion of the set of shell TEEs is established in the second computing device.

13. The system of claim 10, wherein the processing device is further to:
establish, by the first TEE, an additional set of shell TEEs, wherein each additional shell TEE of the additional set of shell TEEs is configured in view of one or more additional configuration parameters associated with the additional set of shell TEEs.

14. The system of claim 13, wherein the processing device is further to:
responsive to determining that the configuration parameters associated with the set of shell TEEs does not satisfy the one or more request parameters for the second TEE, determine, by the first TEE, whether the additional configuration parameters associated with the additional set of shell TEEs satisfy the one or more request parameters for the second TEE; and responsive to determining that the additional configuration parameters associated with the additional set of shell TEEs satisfy the one or more request parameters for the second TEE,
- establish, by the first TEE, the second TEE to satisfy the request, wherein the second TEE is selected from the additional set of shell TEEs; and
- cause, by the first TEE, the second TEE to communicate with the tenant computing device.

15. The system of claim 10, wherein the processing device is further to:
- determine a number of shell TEEs in the set of shell TEEs;
- responsive to determining that the number of shell TEEs satisfies a low threshold, establish, by the first TEE, an additional shell TEE for the set of shell TEEs, wherein the additional shell TEE is configured in view of the one or more configuration parameters associated with the set of shell TEEs.

16. A non-transitory computer readable medium storing instructions which, when executed by a processing device, cause the processing device to:
- establish a first trusted execution environment (TEE) in a first computing device;
- establish, by the first TEE, a set of shell TEEs, wherein each shell TEE is configured in view of one or more configuration parameters associated with the set of shell TEEs;
- receive, by the first TEE, a request from a tenant computing device to establish a second TEE, wherein the request comprises one or more request parameters for the second TEE in the first computing device;
- determine, by the first TEE, whether the configuration parameters associated with the set of shell TEEs satisfy the one or more request parameters for the second TEE; and
- responsive to determining that the configuration parameters associated with the set of shell TEEs satisfy the one or more request parameters for the second TEE,
  - select a shell TEE from the set of shell TEEs to satisfy the request;
  - establish the second TEE in view of the selected shell TEE; and
  - cause, by the first TEE, the second TEE to communicate with the tenant computing device.

17. The non-transitory computer readable medium of claim 16, wherein the tenant computing device communicates with a cloud computing environment that comprises the first computing device and a second computing device, and wherein a first portion of the set of shell TEEs is established in the first computing device and a second portion of the set of shell TEEs is established in the second computing device.

18. The non-transitory computer readable medium of claim 16, wherein the processing device is further to:
- establish, by the first TEE, an additional set of shell TEEs, wherein each additional shell TEE of the additional set of shell TEEs is configured in view of one or more additional configuration parameters associated with the additional set of shell TEEs.

19. The non-transitory computer readable medium of claim 18, wherein the processing device is further to:
- responsive to determining that the configuration parameters associated with the set of shell TEEs does not satisfy the one or more request parameters for the second TEE,
- determine, by the first TEE, whether the additional configuration parameters associated with the additional set of shell TEEs satisfy the one or more request parameters for the second TEE; and
- responsive to determining that the additional configuration parameters associated with the additional set of shell TEEs satisfy the one or more request parameters for the second TEE,
  - establish, by the first TEE, the second TEE to satisfy the request, wherein the second TEE is selected from the additional set of shell TEEs; and
  - cause, by the first TEE, the second TEE to communicate with the tenant computing device.

20. The non-transitory computer readable medium of claim 16, wherein the processing device is further to:
- determine a number of shell TEEs in the set of shell TEEs;
- responsive to determining that the number of shell TEEs satisfies a low threshold, establish, by the first TEE, an additional shell TEE for the set of shell TEEs, wherein the additional shell TEE is configured in view of the one or more configuration parameters associated with the set of shell TEEs.

* * * * *